Patented May 22, 1945

2,376,382

UNITED STATES PATENT OFFICE 2,376,382

ROSIN DERIVATIVES

Donald Price, New York, N. Y., and Everette L. May, East Orange, N. J., assignors to National Oil Products Company, Harrison, N. J., a corporation of New Jersey No Drawing. Application September 13, 1941, Serial No. 410,779

19 Claims. (Cl. 260—97)

This invention relates to derivatives of rosin and allied compounds, and in certain of its more particular aspects, to novel derivatives having excellent surface active properties and to correlated improvements in the process of producing such products. The subject matter of the present invention is closely related to that of the copending application of Price and May, Serial No. 410,778, filed concurrently herewith and entitled "Surface active rosin derivatives," wherein a process for producing alkylated rosin sulfonates in which the alkylation is catalyzed by means of sulfuryl compounds is disclosed and claimed.

Rosin and allied materials afford a cheap source of uniform and reactive organic raw material, and numerous products are at present being manufactured from these substances. However, many of these substances have a tendency to age, with the development of dark color, brittleness, acidity, and other undesirable properties. Further, there have not heretofore been developed any rosin products, other than the rosin soaps, which possess in any substantial degree the properties of detergency, wetting power and foaming power.

Accordingly, it is an object of this invention to provide novel rosin products which will be highly resistant to ageing.

Another object is to provide novel derivatives of rosin and allied substances which will have a high degree of detergency, wetting power and foaming power.

The above and other objects have been achieved by this invention in products which are formed by the alkylation of rosin and like compounds. Preferably each molecule of the product will contain one alkyl group of substantial length, but it may contain two or more of these groups. Such products have properties and uses similar to the rosin compounds from which they are derived, and, in addition, withstand ageing and oxidation to a greater degree than the untreated rosin materials. Further, the sulfonation products of the alkylated rosin compounds of this invention are characterized by having excellent surface active properties whereby they can be used as detergents, wetters, foamers. penetrants and introfiers. These sulfonation products may be made by alkylating the rosin and thereafter sulfonating, or the order of these reactions may be reversed.

Rosin has been cited hereinabove as an example of a raw material for the manufacture of products according to this invention. However, instead of rosin, hydrogenated, dehydrogenated, disproportionated or decarboxylated rosin or rosin oils may be employed. Likewise, the free rosin acids corresponding to the foregoing substances, for example, abietic, pimaric, sapinic and the like acids, are suitable. Similarly, the glyceryl, glycol, ethylene glycol, diethylene glycol, methyl, ethyl, propyl, butyl, pentaerythritol and other esters of rosin or rosin acids, or of hydrogenated, dehydrogenated or disproportionated rosin or rosin acids, may be employed. Examples of these are hydrogenated, dehydrogenated and disproportionated ester gum; the glyceryl, glycol, ethylene glycol, diethylene glycol, methyl, ethyl, propyl, butyl, pentaerythritol and like esters of abietic, dihydroabietic and dehydroabietic acids. Hereinafter all the foregoing and allied substances will be termed generically in this specification and the appended claims as "rosin compounds."

Coming now to the alkylation of the rosin compounds, which may optionally have been sulfonated beforehand, the alkyl group to be condensed with the rosin compound may be any alkyl or aralkyl group containing upwards of 8, and preferably between 10 and 14, carbon atoms. Such groups may be combined with the rosin compounds by the use of alkyl halides, alcohols (primary, secondary or tertiary), alkenes, or naphthenes, and these alkyl-imparting compounds may be condensed with the rosin compounds by means of any Friedel-Crafts catalyst, such as aluminum chloride, boron trifluoride, hydrofluoric acid, ferric chloride, zinc chloride, or the like. The temperatures at which the condensation is carried out may vary from about 50° C. to about 120° C. At the higher temperatures there will be a tendency to decarboxylate any rosin compounds containing carboxyl groups, which action in many cases may be highly desirable as enhancing the stability of the products against deleterious ageing and to the resistance of the sulfonated products to hardness in any aqueous media in which they may be employed. In case it is desired to avoid such decarboxylation, the temperature should be maintained in the lower portion of this range, preferably between 50° C. and 75° C.

Suitable arkyl halides for furnishing the alkyl constituent in the reaction above described include alkyl chlorides containing upwards of 8, and preferably between 10 and 14 carbon atoms, such as the octyl, nonyl, decyl, undecyl, lauryl and myristyl chlorides. Instead of the pure compounds, mixtures of suitable chlorides may be employed, such as the mixtures of chlorides obtainable by the chlorination of petroleum distillates containing alkyl chains of the requisite length. Suitable alcohols are those containing upwards of 8, and preferably 10 to 14 carbon atoms, or mixtures of such alcohols derived by the reduction of the fatty acids in various oils, such as coconut oil, babassu oil, soyabean oil and the like. Suitable alkenes and cycloalkanes will be those containing upwards of 8, and preferably between 10 and 14 carbon atoms. The alkenes may be obtained by dehydration of corresponding alcohols. Both the alkenes and cycloalkanes may be derived from petroleum products or the cracking and dehydrogenation products of petroleum.

Sulfonation of rosin compounds according to the invention may either precede or follow the alkylation step as described above and may be accomplished by means of any usual sulfonating agent, such as sulfuric acid, oleum, sulfur trioxide, chlorsulfonic acid and the like. This reaction may conveniently be carried out by slowly mixing oleum with the alkylated or unalkylated rosin material, which may be dissolved in an inert solvent, if desired, and maintaining the mixture at room temperature or only slightly above for from about ½ to about 3 hours, after which the mixture is neutralized and the sulfonated product isolated, if desired, by extracting it by means of suitable solvents from the neutralized mass.

The unsulfonated alkylated rosin compounds produced according to this invention may be used for any of the purposes for which rosin products are at present employed, and for such uses will have an advantage over untreated rosin products in that they will withstand ageing to a much greater degree. The products may be used, for instance, as sizings for paper and textile materials; as plasticizers in paints and coatings for regenerated cellulose films and as ester gums in varnishes, enamels and the like.

Sulfonation products of alkylated rosins prepared as above outlined are all readily soluble in water and form solutions which have excellent detergent and foaming properties and exert powerful wetting and penetrating action. They are further highly resistant to hardness, acidity, and alkalinity in the media in which they are employed. These properties adapt the products to many industrial and domestic uses, such as, scouring, leveling, dye penetrating and introfying, laundering, cleaning various solid surfaces, removing spray residues from fruit and produce, forming emulsions for spraying, waxing, etc., stabilizing latex, and many other uses of a like nature.

With the foregoing discussion in mind, there are given herewith specific examples for the manufacture of rosin derivatives according to this invention, which examples are to be considered merely as illustrative, and not in any limiting sense. All parts given are by weight.

EXAMPLE I

*Decarboxylated dehydrogenated dodecyl rosin*

10 parts of dehydroabietic acid ("Galex," a dehydrogenated rosin manufactured by the National Rosin Oil and Size Co. of Savannah, Georgia) were dissolved in 40 parts of a paraffinic solvent boiling between 99° C. and 135° C., and 5 parts of $AlCl_3$ were added with stirring. To this mixture were added slowly 6 parts of dodecyl chloride, and the whole boiled under reflux for 30 hours at 125° C. The resultant dark mass was poured into 100 cc. of ice cold 5% aqueous hydrochloric acid. A hydrocarbon layer separated from the mixture and was removed, dried over solid $Na_2SO_4$ and subjected to distillation to remove the paraffinic solvent. Distillation was continued and between 130° C. and 171° C. at 4 mm. pressure a dodecylated rosin product distilled over. This rosin product contained no carboxyl group, the carboxyl group originally present having been destroyed during alkylation. The product was stable against any of the usual ageing phenomena, such as oxidation, yellowing, etc.

EXAMPLE II

*Dehydrogenated alkyl rosin*

A chlorinated kerosene for use in this example and other succeeding examples was prepared as follows: A kerosene fraction boiling in the range from 188° C. to 240° C. and consisting predominantly of paraffins containing between 11 and 13 carbon atoms was maintained at temperatures between 90° C. and 100° C. Gaseous chlorine was passed in until the kerosene fraction had taken up about 40 mol per cent of chlorine.

20 parts of dehydroabietic acid ("Galex"), 33 parts of the chlorinated kerosene prepared as above described, and 45 parts of a petroleum solvent boiling between 99° C. and 135° C. were mixed, and 10 parts of $AlCl_3$ were added with stirring. The reaction mixture was maintained between 50° C. and 60° C. for 15 hours. The resultant mass was poured into 100 parts of aqueous 5% hydrochloric acid. A hydrocarbon layer separated from the mixture and was removed, dried, and subjected to distillation to remove the petroleum solvent and leave a residue consisting largely of a dehydrogenated alkylated rosin of good stability.

EXAMPLE III

*Alkylated hydrogenated rosin*

10 parts of dihydroabietic acid ("Staybellite," a hydrogenated rosin manufactured by the Hercules Powder Co.), 16 parts of the chlorinated kerosene prepared as described in Example II, 25 parts of a petroleum solvent boiling between 99° C. and 135° C. and 5 parts of $AlCl_3$ were mixed, heated and stirred at temperatures between 95° C. and 105° C. for 12 hours. The resultant mass comprised a tarry complex and a brown liquid layer consisting largely of hydrogenated rosin alkylated with the alkyl groups derived from the chlorinated kerosene, part of which rosin had been decarboxylated during the condensation reaction. The liquid layer was decanted, dried over solid $Na_2SO_4$ and subjected to fractional distillation. The decarboxylated alkyl hydrogenated rosin distilled between 160° C. and 188° C. under 11 mm. pressure.

EXAMPLE IV

*Decarboxylated alkylated abietic acid*

10 parts of abietic acid, 16 parts of the chlorinated kerosene prepared as described in Example II, 30 parts of a petroleum solvent boiling between 99° C. and 135° C. and 5 parts of $AlCl_3$ were mixed, heated, and stirred at temperatures between 95° C. and 105° C. for 12 hours. The resulant mass comprised a tarry complex and a brown liquid layer consisting largely of alkylated rosin, part of which was decarboxylated during the condensation reaction. The liquid was distilled to remove the petroleum solvent, leaving a mixture of alkylated rosin and alkylated decarboxylated rosin having excellent stability to oxidation, yellowing and other ageing phenomena.

EXAMPLE V

A portion of the mixed decarboxylated and non-decarboxylated alkyl rosin product of Example IV was fractionally distilled. The decarboxylated rosin alkyl distilled between 160° C. and 197° C. under 14 mm. pressure, leaving behind the non-decarboxylated alkyl rosin. Both products exhibited excellent stability.

EXAMPLE VI 10 parts of rosin, 16 parts of the chlorinated kerosene prepared as described in Example II, 25 parts of a petroleum solvent boiling between 99° C. and 135° C. and 5 parts of AlCl$_3$ were mixed, heated and stirred at temperatures between 95° C. and 105° C. for 12 hours. The resultant mass comprised a tarry complex and a brown liquid layer consisting largely of rosin alkylated with the alkyl groups derived from the chlorinated kerosene, part of which rosin had been decarboxylated during the condensation reaction. The liquid layer was decanted, dried with solid Na$_2$SO$_4$ and subjected to distillation. The decarboxylated alkylated rosin distilled between 160° C. and 188° C. under 11 mm. pressure.

EXAMPLE VII

*Alkylated rosin oil*

10 parts of a rosin oil prepared by destructive distillation of rosin and containing 16% rosin acids, 10 parts of the chlorinated kerosene prepared as described in Example II, 10 parts of a petroleum solvent boiling between 99° C. and 135° C., and 2 parts of AlCl$_3$ were mixed and warmed with stirring to 65° C. 25 additional parts of the chlorinated kerosene prepared as described in Example II were added slowly in the course of the next 1½ hours. The temperature was then slowly raised to 100° C. and this temperature maintained for 6 hours. The resulting condensation mass consisted of a tarry complex and a clear supernatant solution containing a mixture of mono- and poly-alkylated rosin oil. The supernatant solution was decanted from the tar and subjected to fractional distillation to remove the petroleum solvent. The residue of mono- and polycarboxylated rosin oil had the same excellent properties characterizing the products in the other examples.

EXAMPLE VIII

A portion of the mixed alkylated rosin oil product of Example IX was fractionally distilled, the mono-alkylated rosin oil coming over between 160° C. and 188° C. at 14 mm. The undistilled residue consisted largely of polyalkylated rosin oil. Both fractions were highly resistant to ageing.

EXAMPLE IX

*Alkylated dehydrogenated rosin methyl ester*

5 parts of methyl dehydroabietic acid ("Galex methyl ester," a methyl ester of a dehydroabietic acid manufactured by the National Rosin Oil and Size Company of Savannah, Georgia), 25 parts of a petroleum solvent boiling between 99° C. and 135° C. and 2.5 parts of AlCl$_3$ were mixed and a solution containing 3.5 parts of dodecyl chloride and 10 parts of the petroleum solvent were added with stirring. The reaction mixture was slowly heated to boiling and refluxed at temperatures between 106° C. and 115° C. for 36 hours. The mixture was then poured into 50 parts of 5% aqueous hydrochloric acid. A hydrocarbon layer separated from the mass and was removed, dried over solid Na$_2$SO$_4$ and subjected to fractional distillation. The fraction distilling between 150° C. and 170° C. under 1 mm. pressure consisted mainly of a methyl ester of a dodecyl dehydroabietic acid and possessed excellent resistance to oxidation.

EXAMPLE X 10 parts of methyl dehydroabietic acid ("Galex methyl ester"), 20 parts of a petroleum solvent boiling between 99° C. and 135° C., 17 parts of the chlorinated kerosene prepared as described in Example II, and 5 parts of AlCl$_3$ were mixed. The mixture was heated to 50° C. and maintained between 50° C. and 60° C. with stirring for 9 hours. The mixture was then poured into 50 parts of 5% aqueous hydrochloric acid. A hydrocarbon layer separated from the mass and was removed, dried over solid Na$_2$SO$_4$ and subjected to fractional distillation. The fraction distilled between 156° C. and 174° C. under 2 mm. pressure consisted mainly of methyl esters of an alkylated dehydroabietic acid, which withstood ageing tests in a manner far superior to the starting material.

EXAMPLE XI 10 parts of methyl dihydroabietic acid ("Hercolyn," a methyl ester of hydrogenated rosin manufactured by the Hercules Powder Co.), 20 parts of a petroleum solvent boiling between 99° C. and 135° C., 16 parts of the chlorinated kerosene prepared as described in Example II, and 5 parts of AlCl$_3$ were mixed. The reaction mixture was heated to 80° C. and maintained at this temperature, with stirring, for 6 hours. The temperature was then raised to 100° C. and maintained between 100° C. and 110° C., with stirring, for 4 hours. The mixture was then poured into 50 parts of 5% aqueous hydrochloric acid. A hydrocarbon layer separated from the mass and was removed, dried over solid Na$_2$SO$_4$ and subjected to fractional distillation. The fraction distilling between 164° C. and 174° C. under 3 mm. pressure consisted mainly of a methyl ester of alkylated stabilized rosin.

EXAMPLE XII 10 parts of methyl abietate, 10 parts of a petroleum solvent boiling between 99° C. and 135° C., 28 parts of the chlorinated kerosene prepared as described in Example II, and 5 parts of AlCl$_3$ were mixed. The reaction mixture was heated and maintained between 65° C. and 70° C. for 5 hours. The mixture was then poured into 50 parts of 5% aqueous hydrochloric acid. A hydrocarbon layer separated from the mass and was removed, dried over solid Na$_2$SO$_4$ and subjected to fractional distillation. The fraction distilling between 140° C. and 177° C. under 2 mm. pressure consisted mainly of methyl esters of alkylated abietic acids, which exhibited outstanding resistance to ageing.

EXAMPLE XIII

Each of the alkylated rosin products prepared as described in the foregoing examples was sulfonated as follows: to 10 parts of the alkylated rosin product were slowly added, with mixing, 20 parts of a 20% oleum at temperatures ranging between 15° C. and 25° C. The temperature was maintained at about 30° C. for ½ hour, after which the reaction mixture was poured onto cracked ice, neutralized and evaporated down to yield the sulfonated product. In every case the sulfonated product was freely soluble in water, and possessed excellent detergent, wetting, foaming and penetrating properties. These properties were maintained even in solutions containing considerable degrees of acidity, alkalinity and hardness.

It will thus be seen that there is provided by this invention a new class of rosin products which possess the same desirable properties of the older rosin products, and have the additional advantage of resistance to ageing and oxidation. Further, the sulfonation products of the alkylated rosins of this invention provide a class of surface active compounds which may be easily and cheaply prepared from readily and cheaply procurable starting materials. These products are all characterized by outstanding detergent, wetting and foaming powers, and by their retention of these powers in spite of a considerable degree of acidity, alkalinity and hardness of the media in which they may be used.

The expression "sulfonated" is used herein to connote the sulfonic acid derivatives as well as the corresponding alkali metal, ammonium and like salts thereof.

Since certain changes in carrying out the above process and certain modifications in the product which embody the invention may be made without departing from its scope, it is intended that all matter contained in the above description shall be interpreted as illustrative and not in a limiting sense.

It is also to be understood that the following claims are intended to cover all the generic and specific features of the invention herein described, and all statements of the scope of the invention, which as a matter of langauge might be said to fall therebetween.

Having described our invention what we claim as new and desire to secure by Letters Patent is:

1. As new chemical compounds, the class of alkylated compounds containing nuclei of a material selected from the group consisting of rosin; hydrogenated, dehydrogenated, disproportionated and decarboxylated rosin; the free acids corresponding to rosin and hydrogenated, dehydrogenated, and disproportionated rosin; and esters of the aforementioned acids; the alkyl group being aliphatic in character and containing at least eight carbon atoms.

2. As new chemical compounds, the class of alkylated compounds containing nuclei of a material selected from the group consisting of rosin; hydrogenated, dehydrogenated, disproportionated and decarboxylated rosin; the free acids corresponding to rosin and hydrogenated, dehydrogenated, and disproportionated rosin; and esters of the aforementioned acids; the alkyl group being aliphatic in character and containing ten to fourteen carbon atoms.

3. As new chemical compounds, the class of sulfonated alkylated compounds containing nuclei of a material selected from the group consisting of rosin; hydrogenated, dehydrogenated, disproportionated and decarboxylated rosin; the free acids corresponding to rosin and hydrogenated, dehydrogenated, and disproportionated rosin; and esters of the aforementioned acids; the alkyl group containing at least eight carbon atoms.

4. As new chemical compounds, the class of sulfonated alkylated compounds containing nuclei of a material selected from the group consisting of rosin; hydrogenated, dehydrogenated, disproportionated and decarboxylated rosin; the free acids corresponding to rosin and hydrogenated, dehydrogenated, and disproportionated rosin; and esters of the aforementioned acids; the alkyl group containing ten to fourteen carbon atoms.

5. As new chemical compounds, the class consisting of rosin, hydrogenated, dehydrogenated, disproportionated and decarboxylated rosin; the free acids corresponding to rosin and hydrogenated, dehydrogenated, and disproportionated rosin; and esters of the aforementioned acids; said compounds further having an aliphatic alkyl group containing ten to fourteen carbon atoms.

6. As new chemical compounds, the class consisting of rosin; hydrogenated, dehydrogenated, disproportionated and decarboxylated rosin; the free acids corresponding to rosin, hydrogenated, dehydrogenated, and disproportionated rosin; and esters of the aforementioned acids; said compound further being sulfonated and alkylated with an alkyl group containing 10 to 14 carbon atoms.

7. As a new chemical compound, alkylated dehydroabietic acid, wherein the alkyl group contains at least eight carbon atoms.

8. As a new chemical compound, alkylated rosin, wherein the alkyl group is aliphatic in character and contains at least eight carbon atoms.

9. As a new chemical compound, alkylated rosin oil, wherein the alkyl group contains at least eight carbon atoms.

10. As a new chemical compound, sulfonated alkylated dehydroabietic acid, wherein the alkyl group contains ten to fourteen carbon atoms.

11. As a new chemical compound, sulfonated alkylated rosin, wherein the alkyl group contains ten to fourteen carbon atoms.

12. As a new chemical compound, sulfonated alkylated rosin oil, wherein the alkyl group contains ten to fourteen carbon atoms.

13. A process of producing novel rosin derivatives, which comprises alkylating a compound selected from the group consisting of rosin; hydrogenated; dehydrogenated, disproportionated and decarboxylated rosin; the free acids corresponding to rosin and hydrogenated, dehydrogenated, and disproportionated rosin; and esters of the aforementioned acids; with an aliphatic alkylating agent containing at least eight carbon atoms.

14. A process of producing novel rosin derivatives, which comprises alkylating a compound selected from the group consisting of rosin; hydrogenated; dehydrogenated, disproportionated and decarboxylated rosin; the free acids corresponding to rosin and hydrogenated, dehydrogenated, and disproportionated rosin; and esters of the aforementioned acids; with an alkylating agent containing at least eight carbon atoms and sulfonating the alkylated product.

15. A process for producing novel rosin derivatives, which comprises condensing a compound selected from the group consisting of rosin; hydrogenated; dehydrogenated, disproportionated and decarboxylated rosin; the free acids corresponding to rosin and hydrogenated, dehydrogenated, and disproportionated rosin; and esters of the aforementioned acids; with an alkyl halide containing more than eight carbon atoms in the presence of a Friedel-Crafts catalyst at a temperature of about 50° C. to 120° C.

16. A process for producing novel rosin derivatives, which comprises condensing a compound selected from the group consisting of rosin; hydrogenated; dehydrogenated, disproportionated and decarboxylated rosin; the free acids corresponding to rosin and hydrogenated, dehydrogenated, and disproportionated rosin; and esters of the aforementioned acids; with a chlorinated petroleum fraction containing more than eight carbon atoms in the presence of a Friedel-Crafts catalyst at a temperature of about 50° C. to 120° C.

17. A process for producing novel rosin derivatives, which comprises condensing a compound selected from the group consisting of rosin; hydrogenated; dehydrogenated, disproportionated and decarboxylated rosin; the free acids corresponding to rosin and hydrogenated, dehydrogenated, and disproportionated rosin; and esters of the aforementioned acids; with an alkyl halide containing more than eight carbon atoms in the presence of a Friedel-Crafts catalyst at a temperature of about 50° C. to 120° C. and sulfonating the alkylated product.

18. A process for producing novel rosin derivatives, which comprises condensing a compound selected from the group consisting of rosin; hydrogenated; dehydrogenated, disproportionated and decarboxylated rosin; the free acids corresponding to rosin and hydrogenated, dehydrogenated, and disproportionated rosin; and esters of the aforementioned acids; with a chlorinated derivative of a kerosene fraction boiling within the range of 188° C. to 240° C. and containing more than eight carbon atoms in the presence of a Friedel-Crafts catalyst at a temperature of about 50° C. to 120° C.

19. A process for producing novel rosin derivatives, which comprises condensing a compound selected from the group consisting of rosin; hydrogenated; dehydrogenated, disproportionated and decarboxylated rosin; the free acids corresponding to rosin and hydrogenated, dehydrogenated, and disproportionated rosin; and esters of the aforementioned acids; with a chlorinated derivative of a kerosene fraction boiling within the range of 188° C. to 240° C. and containing more than eight carbon atoms in the presence of a Friedel-Crafts catalyst at a temperature of about 50° C. to 120° C. and sulfonating the alkylated product.

DONALD PRICE.
EVERETTE L. MAY.